United States Patent
Li

(10) Patent No.: US 8,250,038 B2
(45) Date of Patent: Aug. 21, 2012

(54) SYSTEM AND METHOD FOR DATA BACKUP IN COMMUNICATION DEVICES

(75) Inventor: Jun Li, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

(*) Notice: Subject to any disclaimer, the term of this patent is extended or adjusted under 35 U.S.C. 154(b) by 219 days.

(21) Appl. No.: 12/846,841

(22) Filed: Jul. 30, 2010

(65) Prior Publication Data

US 2011/0191391 A1    Aug. 4, 2011

(30) Foreign Application Priority Data

Feb. 3, 2010   (CN) .......................... 2010 1 0301168

(51) Int. Cl.
*G06F 7/00*     (2006.01)
*G06F 17/00*    (2006.01)

(52) U.S. Cl. ..... 707/654; 455/527; 455/574; 455/575.4; 340/815.4

(58) Field of Classification Search ............... 455/517, 455/574, 575.4; 340/815, 4; 707/654
See application file for complete search history.

(56) References Cited

U.S. PATENT DOCUMENTS

| | | | | |
|---|---|---|---|---|
| 5,984,537 A * | 11/1999 | Park | ............................. | 396/443 |
| 6,373,397 B1 * | 4/2002 | Song | ........................... | 340/815.4 |
| 7,085,594 B2 * | 8/2006 | Hosoi | ............................ | 455/572 |
| 2002/0085371 A1* | 7/2002 | Katayama et al. | ............. | 362/85 |
| 2009/0248759 A1* | 10/2009 | Okada et al. | ................. | 707/204 |
| 2009/0327362 A1* | 12/2009 | Shah et al. | .................... | 707/204 |
| 2010/0331062 A1* | 12/2010 | Christensen et al. | ...... | 455/575.4 |

* cited by examiner

*Primary Examiner* — Shew-Fen Lin
(74) *Attorney, Agent, or Firm* — Altis Law Group, Inc.

(57) ABSTRACT

A system and method automatically backup unsaved data in a communication device if a back cover of the communication device is removed. An identifier of an application of the communication device is received. Based on the received identifier, an application corresponding to the received identifier is registered. If the back cover of the communication device is removed, a save signal is sent to the registered application and the unsaved data of the registered application is saved to a storage unit of the communication device.

9 Claims, 3 Drawing Sheets

SYSTEM AND METHOD FOR DATA BACKUP IN COMMUNICATION DEVICES

BACKGROUND

1. Technical Field

Embodiments of the present disclosure relate to data backup, and more particularly to a system and method for providing automatic data backup in communication devices.

2. Description of Related Art

As communication devices provide increased multimedia and wireless capability, mobile device battery consumption is also increased. When a battery is exhausted, unsaved information in the device may be lost if the battery has been removed without a saving procedure having been executed.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 1:
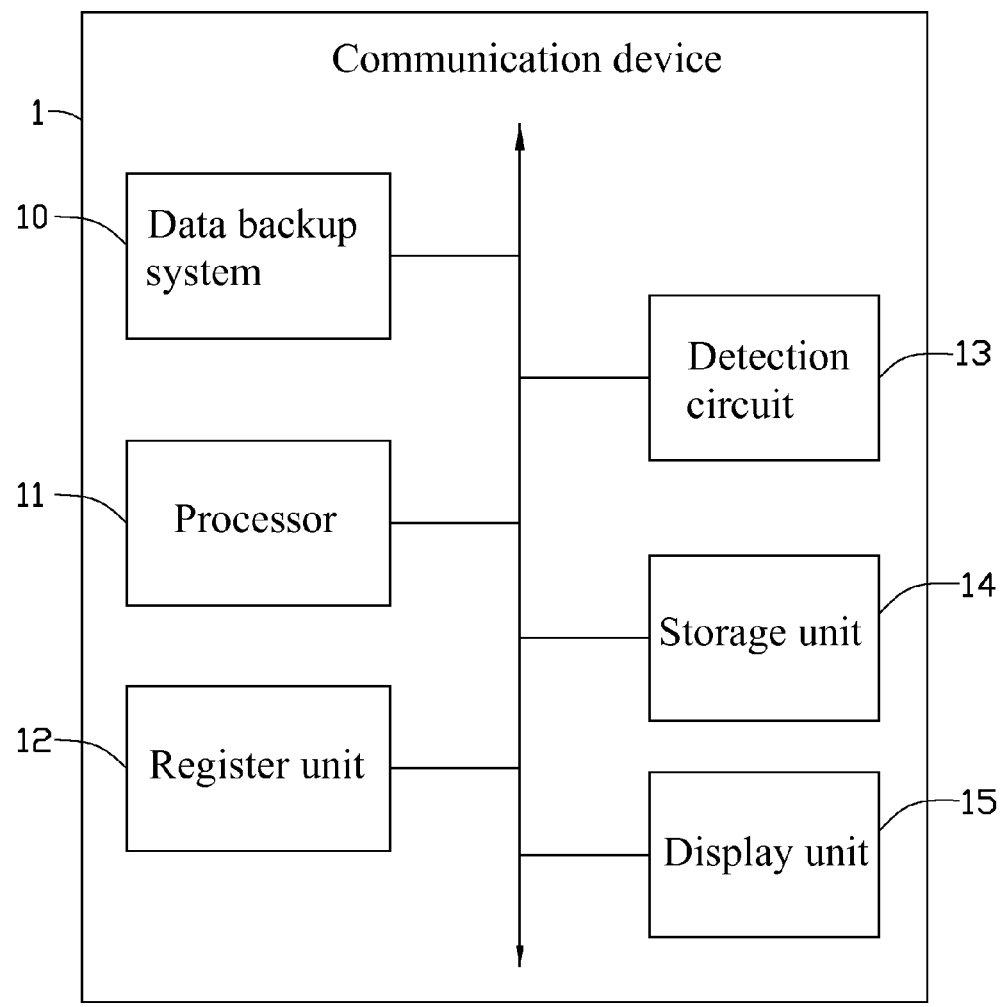
FIG. 1 is a block diagram of one embodiment of a communication device with a data backup system.

FIG. 1 is a block diagram of one embodiment of a communication device 1 with a data backup system 10. The data backup system 10 can back up data automatically in the communication device 1 upon detecting removal of a battery of the communication device 1. In one embodiment, the communication device 1 includes the data backup system 10, a processor 11, a register unit 12, a detection circuit 13, a storage unit 14 and a display unit 15. Depending on the embodiment, the communication device 1 may be an electronic device, such as a mobile phone, a notebook computer, a handheld game console, a digital camera (DC), a handheld computer, or a personal digital assistant (PDA), for example.

The communication device 1 is generally controlled and coordinated by operating system software, such as the UNIX, Linux, Windows 95, 98, NT, 2000, XP, Vista, Mac OS X, an embedded operating system, or any other compatible operating systems. In other embodiments, the electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

The storage unit 14 is electronically connected to the data backup system 10, the processor 11, the register unit 12, the detection circuit 13 and the display unit 15. The storage unit 14 stores many kinds of data, such as a customization function code of the communication device 1, computerized codes of the system data backup system 10, programs of an operating system and other applications installed in the communication device 1. The storage unit 12 may include a hard disk drive, flash memory, RAM, ROM, cache, or external storage media.

The detection circuit 13 is operable to output a voltage value to the data backup system 10. The detection circuit 13 includes a first metal dome and a second metal dome. The first metal dome and the second metal dome are configured in the back cover and a main body of the communication device 1 respectively. In one embodiment, the first metal dome contacts the second metal dome when the back cover is present in the communication device 1. The detection circuit 13 then forms a closed loop circuit of the detection circuit 13 and outputs a non-zero voltage to the determination module 102. The first metal dome does not contact the second metal dome if the back cover has been removed from the communication device 1, whereby no closed loop circuit of the detection circuit 13 is formed and zero voltage is output to the determination module 102.

The register unit 12 provides a register memory space to be registered from an application of the communication device 1 controlled by the data backup system 10 and saves the identifier of the registered application to the register memory space. The registered application of the communication device 1 can include a communication application, a short message application, a multimedia player or a recording application.

The display unit 15 is operable to display data processing for the communication device 1. In addition, the display unit 15 is operable to provide a graphic user interface (GUI) for input. The display unit 15 may be a display screen, a resistive touch screen or a capacitive touch screen.

The processor 11 is operable to execute one or more computerized codes of the data backup system 10 stored in the storage unit 14 and executed by the processor 11. The processor 11, as an example, may include a CPU, math coprocessor, shift register, or other computing circuits.

The data backup system 10 registers the registered application of the communication device 1 to the register unit 12. In addition, the data backup system 10 further directs the registered application to save unsaved data of the registered application to the storage unit 14 upon detection of removal of the back cover by the detection circuit 13.

Figure 2:
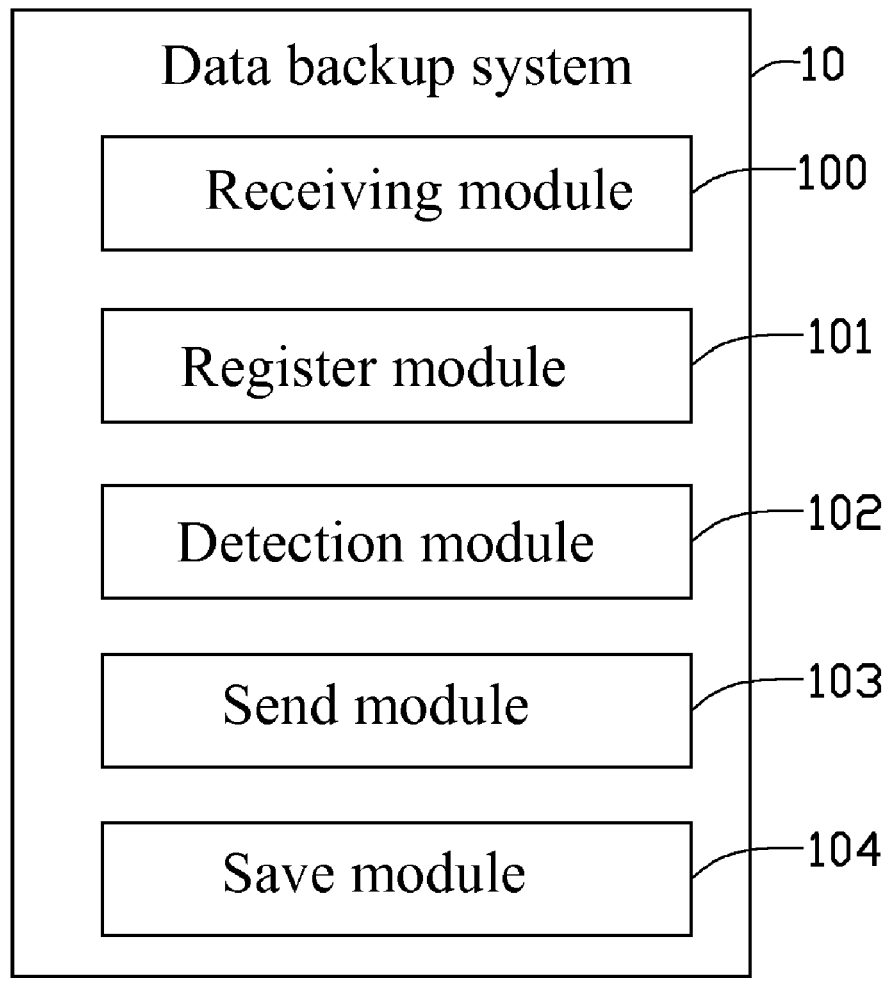
FIG. 2 is a block diagram of one embodiment of the data backup system of FIG. 1.

FIG. 2 is a block diagram of one embodiment of the data backup system 10 of FIG. 1. The data backup system 10 includes a receiving module 100, a register module 101, a detection module 102, a send module 103 and a save module 104. The receiving module 100 is configured to receive an identifier of the registered application for the communication device 1 from the storage unit 14. The identifier of the application is an 8-bit identifier used as shorthand for the application specific identifier. In one embodiment, the identifier can be an identifier number to indicate a corresponding application. For example, a process identifier (Process ID) is an identifier of a running application assigned by an operating system.

The register module 101 is operable to register the registered application of the communication device 1 to the register unit 12 based on the received identifier. In addition, the register module 101 saves the register information to the register unit 12. In one embodiment, the register unit 12 can be a Binary Runtime Environment for Wireless (BREW).

The detection module 102 is operable to execute the detection circuit 13 to determine whether a back cover of the communication device 1 has been removed, with a non-zero voltage value from the detection circuit 13 indicating the cover is present and zero voltage indicating that the cover has been removed.

The send module 103 is operable to send a save signal to the register unit 12 and to transmit the save signal from the register unit 12 to the registered application of the communication device 1 upon detection that the back cover has been removed.

The save module 104 is operable to direct the registered application of the communication device 1 to save unsaved data of the registered application to the storage unit 14. As an example, if text is entered on the communication device 1, the detection module 102 determines whether the back cover has been removed and the send module 103 sends a save signal to the register unit 12. The register unit 12 then transmits the save signal to direct the registered application of the communication device 1 to save unsaved data of the registered application to the storage unit 14.

Figure 3:
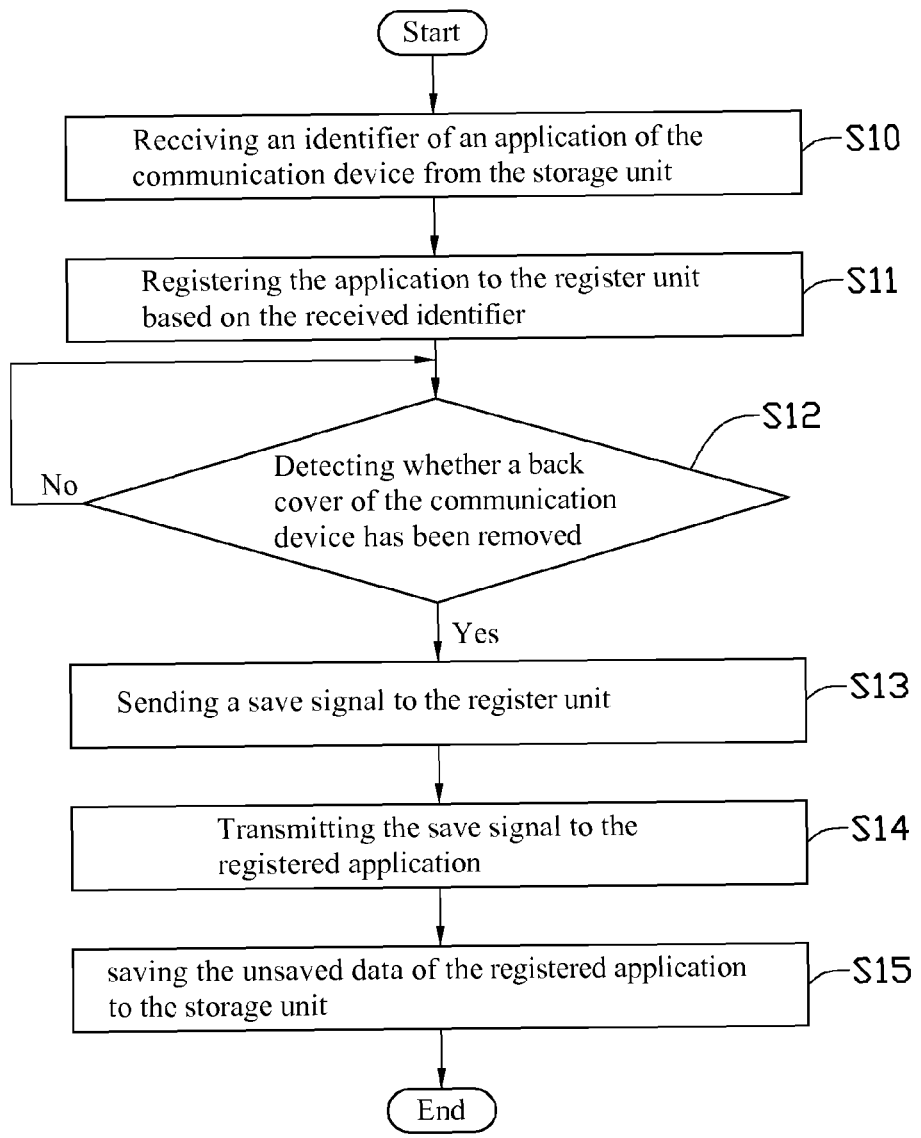
FIG. 3 is a flowchart illustrating one embodiment of a data backup method for a communication device.

FIG. 3 is a flowchart illustrating one embodiment of a data backup method for a communication device. Depending on the embodiment, additional blocks may be added, others deleted, and the ordering of the blocks may be changed.

In block S10, the receiving module 100 receives an identifier of the registered application of the communication device 1 from the storage unit 14. The registered application includes communication application, short message application, multimedia player or recording application.

In block S11, the register module 101 registers the registered application of the communication device 1 to the register unit 12 based on the received identifier and saves the register information to the register unit 12. In one embodiment, the register unit 12 is a Binary Runtime Environment for Wireless (BREW).

In block S12, the detection module 102 determines whether the back cover has been removed by the detection unit 13. The detection module 102 determines that the back cover is present in the communication device 1 upon detecting a non-zero voltage value from the detection circuit 13 and block S13 is implemented. Alternatively, The detection module 102 determines that the back cover has been removed from the communication device 1 upon detecting zero voltage value from the detection circuit 13 and the detection module 102 continues to detect the back cover status.

In block S13, the send module 103 sends a save signal to the register unit 12.

In block S14, the send module 103 transmits the save signal from the register unit 12 to the registered application of the communication device 1.

In block S15, the save module 104 directs the registered application of the communication device 1 to save the unsaved data of the registered application to the storage unit 14.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A data backup system for a communication device, the data backup system comprising:
   the communication device comprising a processor, a storage unit, a display, a detection circuit and a register unit;
   a receiving module to receive an identifier of an application of the communication device from the storage unit;
   a register module to register the application to the register unit based on the received identifier;
   a detection module to implement the detection circuit to determine whether a back cover of the communication device has been removed;
   a send module to send a save signal to the register unit and transmit the save signal from the register unit to the registered application upon detection that the back cover has been removed;
   a save module to direct the registered application to save any unsaved data of the registered application to the storage unit;
   wherein the communication device is a mobile phone; and
   wherein the detection module detects the back cover is present in the communication device upon detecting a non-zero voltage.

2. The data backup system of claim 1, wherein the detection module detects the back cover status by voltage changes of the communication device.

3. The data backup system of claim 2, wherein the detection module detects the back cover has been removed from the communication device upon detecting a zero voltage.

4. A data backup method for a communication device, the method comprising:
   receiving an identifier of an application of the communication device from the storage unit;
   registering the application to the register unit based on the received identifier;
   detecting whether a back cover of the communication device has been removed;
   sending a save signal to the register unit upon detection that the back cover has been removed;
   transmitting the save signal from the register unit to the registered application;
   saving the unsaved data of the registered application to the storage unit;
   wherein the communication device is a mobile phone; and
   wherein the back cover is detected as a status installed in the communication device upon detecting a non-zero voltage.

5. The method of claim 4, wherein the step of detecting the back cover status is by a voltage changes of the communication device.

6. The method of claim 5, wherein the back cover is detected as a status removed from the communication device upon detecting a zero voltage.

7. A storage medium having stored thereon instructions that, when executed by a processor, causes the processor to perform a data backup method for a communication device, the method comprising:
   receive an identifier of an application of the communication device from the storage unit;
   register the application to the register unit based on the received identifier; determine whether a back cover of the communication device has been removed;
   send a save signal to the register unit upon detection that the back cover has been removed;
   transmit the save signal from the register unit to the registered application;

save the unsaved data of the registered application to the storage unit;

wherein the communication device is a mobile phone; and wherein the back cover is detected as a status installed in the communication device upon detecting a non-zero voltage.

8. The storage medium of claim 7, wherein the step of detect the back cover status is by a voltage changes of the communication device.

9. The storage medium of claim 8, wherein the back cover is detected as a status removed from the communication device upon detecting a zero voltage.

* * * * *